United States Patent [19]

Pratt

[11] Patent Number: 5,046,348
[45] Date of Patent: Sep. 10, 1991

[54] BLIND FASTENER FOR COMPOSITE MATERIALS

[75] Inventor: John D. Pratt, Rancho Cucamonga, Calif.

[73] Assignee: Textron, Inc., Providence, R.I.

[21] Appl. No.: 531,044

[22] Filed: May 31, 1990

Related U.S. Application Data

[62] Division of Ser. No. 417,281, Oct. 5, 1989, abandoned.

[51] Int. Cl.⁵ ............................................... B21K 1/70
[52] U.S. Cl. ........................................ 72/356; 72/367; 10/27 PH
[58] Field of Search ................ 72/276, 283, 356, 367, 72/370; 10/27 PH

[56] References Cited

U.S. PATENT DOCUMENTS 2,030,167  2/1936  Miller ..................................... 411/34
3,461,771  8/1969  Briles ..................................... 411/34

FOREIGN PATENT DOCUMENTS 116938  7/1983  Japan ..................................... 72/370

Primary Examiner—Lowell A. Larson
Attorney, Agent, or Firm—Knobbe, Martens, Olson & Bear

[57] ABSTRACT

The fastener assembly includes a generally solid pin, positioned within a tubular fastener body and a buckle sleeve. The fastener body has a generally cylindrical configuration and includes an enlarged head adjacent one end thereof, an intermediate shank portion, and a nose portion adjacent the other end thereof. The nose portion engage the buckle sleeve, and during installation causes the buckle of the buckle sleeve to form prior to workpiece contact by the interaction between the nose portion of the fastener and the leading edge of the buckle sleeve. The sleeve buckles the intersection between a trailing section and the largest inner diameter at the end of a tapered interior section.

1 Claim, 3 Drawing Sheets

BLIND FASTENER FOR COMPOSITE MATERIALS

This application is a division of application Ser. No. 417,281 filed Oct. 5, 1989, now abandoned.

BACKGROUND OF THE INVENTION

The present invention relates to blind fasteners employed to join composite materials.

A particular type of such a fastener is a blind rivet, well known in the prior art, used to fasten components when only one side of the workpiece is accessible. These fasteners generally comprise a stem or mandrel having a buckle-forming head at one end and serrations at the other end for engagement by a pulling tool; a tubular body surrounding the mandrel and having a flanged head; and, a locking collar encircling the mandrel near the body head. In use, the head portion of the mandrel and the surrounding body together are inserted through a hole in the workpiece. A riveting tool including a pulling head is used to translate the mandrel axially away from the workpiece. During such translation, the buckle-forming elements of the mandrel head expand the rivet body laterally to form a buckle on the blind side of the workpiece. The pulling head then forces the locking collar into a groove in the mandrel to lock the headed, accessible end of the body to the stem. Finally, the stem portion of the mandrel extending from the workpiece is broken off to complete the installation.

Another type of blind fastener has a threaded body to receive a setting screw or core bolt, with a separate buckle sleeve as the expandable element. The sleeve is expanded on the blind side of the workpiece by tightening the threaded core bolt and fastener body. The fastener body has a manufactured head for bearing on the setting side of the workpiece. This head may have wrenching flats for use of a wrenching tool to prevent fastener body rotation during setting. The manufactured head may protrude or be flush. The fastener body has a shank with a diameter for substantially complete occupancy of the aligned holes in the workpieces. A blind side end of the fastener body, the end opposite the manufactured head, is a nose which externally tapers to provide an expansion surface over which the sleeve expands and forms against the workpiece.

The sleeve is cylindrical and has an external diameter no greater than the diameter of the fastener body so that the sleeve passes through the aligned holes in the workpieces, with an internal diameter for receipt of the core bolt. The core bolt head has a diameter no greater than the diameter of the sleeve for passage to the blind side and a radial shoulder for bearing on the end of the sleeve. The core bolt has wrenching flats or other means on the setting side for tightening in the female threads of the fastener body. As the core bolt is rotated in the thread and moved axially relative to the fastener body, the bolt head bears on the sleeve and the sleeve is forced over the nose of the fastener body and expanded against the blind side of a joint. Load determining means such as a breakneck in the bolt can break to stop tightening and determine the amount of clamp-up force.

In joining materials such as aluminum, damage to the hidden, or "blind" side of the workpiece by these conventional fastener assemblies had to be considered, but was not of major concern due to the inherent strength and reduced frangibility of aluminum and other materials. Such damage generally occurred during the contact of the buckle sleeve with the blind side of the workpiece prior to buckle formation. Without the formed buckle to dissipate the force of the pulling mandrel or bolt along a large area of the workpiece, the relatively smaller area buckle sleeve contacted the workpiece during buckle formation, thereby transmitting the pulling force of the mandrel or bolt onto a relatively small area of the workpiece.

However, the use and development of composite materials such as graphite or fiber/epoxy matrix has increased. Therefore, the problem of damaging the more sensitive composites from the blind side during buckle formation is of concern, as these composites are more prone to damage when such concentrated force is transmitted. While conventional fastener assembly configurations may prove useful in connection with certain materials and in certain workpiece stress situations, there exists a need for a fastener assembly which provides substantially reduced stress on a workpiece, specifically workpieces made of composite material, during fastener setting and buckle formation. Reduction of workpiece stress is especially important in aerospace applications which presently use a variety of newly developed composite materials.

A number of blind fastener assemblies for composite materials have been developed, with the primary focus on formation of the buckle in the buckle sleeve substantially prior to contact with the workpiece. Forming the buckle prior to workpiece contact dissipates the force of the pulling mandrel along a larger area of the blind side of the workpiece, thereby reducing the chance that the composite workpiece will fail during compression. One such fastener is U.S. Pat. No. 4,312,613 to Binns, disclosing a multiple shoulder type rivet assembly.

In the multiple shoulder configuration, the sleeve and rivet body are specifically configured such that, as the mandrel is pulled through the workpiece, the rivet sleeve begins to slide and expand laterally over the dual-domed tail portion of the body member, substantially forming two buckles at the shoulder areas prior to sleeve contact with the workpiece. However, a problem with this assembly is that the action on which the dual buckle formation and propagation depend requires multiple intermediate configurations of the buckle sleeve during buckle formation, thereby increasing the likelihood of incomplete or discontinuous buckle formation prior to workpiece contact, thus increasing the likelihood of workpiece damage.

Furthermore, to the above shortcomings, the dual shoulder rivet requires a complex tail geometry on the rivet body and buckle sleeve, requiring expensive secondary manufacturing operations on the dual-domed tail end of the body member and the dual-shoulder buckle sleeve.

SUMMARY OF THE INVENTION

The present invention overcomes the problems associated with the prior art and provides a means for joining pieces together such that improvements in strength and integrity are achieved with a reduced likelihood of workpiece damage.

The present invention pre-forms the large bearing area of the buckle prior to contact with the workpiece, thereby avoiding exceeding a predetermined unit load on a composite workpiece. The buckle is formed by compression between a tubular fastener body and pin head by advancing the pin and forming the buckle prior to its contact with the blind side of the workpiece, avoiding application of a high unit load on the workpiece which would occur if the workpiece reacted all the compression load. The buckle forms substantially prior to its contact against the backside workpiece progressively and in a controlled fashion. Assurance of buckle formation prior to contact on the backside of the blind side workpiece results from the interaction between a weakened internal shoulder in the buckle sleeve, and buckle sleeve interaction with the contact and slide sections of the nose of a fastener body.

The present invention provides a blind fastener characterized by an expandable sleeve that upon expansion, produces a buckle having a large bearing area for transfer of load from the sleeve to a backside workpiece surface of a joint formed of at least two workpieces and the fastener. The buckle is substantially completely formed prior to contact with the workpiece. The sleeve buckles in response to compressive loading of the sleeve between the nose of a fastener body and a head of the fastener pin. Compressive loading is produced by tightening the threads of the core bolt within threads of the fastener body, or alternatively, by pulling the mandrel of a rivet-type fastener.

A specific embodiment of the present invention comprises a fastener body having female threads for receipt of a male threaded core bolt or pin. The bolt in turn has a head for bearing on the buckle sleeve on the blind side of the workpiece. The buckle sleeve is received on the bolt between the bolt head and a contact section of the nose of the fastener body. The buckle sleeve has a relieved shoulder located at the juncture of the tapered and trailing sections of the buckle sleeve. A leading edge of the sleeve contacts the contact section of the nose of the fastener body for the formation of a blind side buckle. The tapered section of the sleeve is tapered internally with the taper extending from a smaller diameter at the leading edge of the sleeve to a larger diameter towards the trailing section. The wall thickness of the tapered section decreases the greater the distance away from the leading edge. The tapered section is backed axially at the end of the sleeve by the trailing section of the sleeve. The trailing section has an inside diameter that receives with a close fit the shank of the bolt. The trailing section of the sleeve prevents tuck-out of the sleeve over the head of the bolt and determines the zone of buckle formation to be at the shoulder.

The fastener body has a manufactured head for bearing on a setting side of the workpiece. The fastener body has a nose end with a contact section and an adjoining slide section. The outer diameter of the fastener body increases from the end of the contact section, through the slide section to the shank of the fastener body. The contact and slide sections of the nose of the fastener body in conjunction with the shoulder of the buckle sleeve assure initiation of buckling on the sleeve and buckle formation prior to contact with the exposed surface of the workpiece. The buckle contact section of the fastener causes the sleeve to initially buckle or fold upon being loaded axially during contact with the contact section. The leading edge of the sleeve slides along the nose radius and onto the slide section. The buckle continues to form during the slide of the leading edge along the slide section. The sleeve leading edge next slides from the slide section along the cylindrical shank of the fastener body to present a large bearing area to a backside workpiece after the buckle has substantially completely formed. The presentation of a formed buckle to contact the workpiece keeps unit loading on the workpiece below the failure load of the workpiece material. However, the required clamp-up load on the workpieces along the axis of the fastener can still be met. The pin or core bolt preferably has a breakneck portion so that a tail section of the pin separates from the permanent section of the pin at a predetermined load corresponding to a predetermined clamp-up force.

A method for forming the buckle sleeve of the instant invention is provided which comprises forming a semi-finished buckle sleeve comprising a trailing section, a tapered section and a leading edge. The semi-finished buckle sleeve has a constant inner diameter throughout the trailing section with the inner diameter increasing through a radius at an inner shoulder located between the trailing section and the tapered section, the inner diameter then remaining constant throughout the tapered section to the leading edge.

The semi-finished sleeve has a constant outer diameter through the trailing section to the tapered section wherein the outer diameter and wall thickness gradually increases to the leading edge. The semi-finished buckle sleeve is then shaped to form the finished buckle sleeve by deforming the tapered section to produce a constant outer diameter along the entire length of the buckle sleeve. This is preferably performed by camming the tapered section inwardly through application of force at the outer portion of the leading edge. This action changes the inner diameter of the forward portion of the semi-finished buckle sleeve while, the inner diameter remains constant along the trailing section to the radius at the internal shoulder. The inner diameter then gradually decreases throughout the tapered section to the leading edge. In the finished buckle sleeve, the inner diameter of the leading edge and the inner diameter throughout the trailing section is substantially equal.

The deformation of the semi-finished buckle sleeve is preferably accomplished through the insertion of the sleeve into a forming die. The die has a tapered receiving portion with cam surfaces which cam the tapered section of the semi-finished sleeve inwardly by application of force to the outer surface of the leading edge of the semi-finished sleeve. The sleeve is advanced axially into the forming die until the entire outer diameter of the sleeve is constant.

These and other features, aspects and advantages of the present invention will become more apparent from the following description, appended claims and drawings.

DETAILED DESCRIPTION OF THE PREFERRED EMBODIMENT

Figure 1:
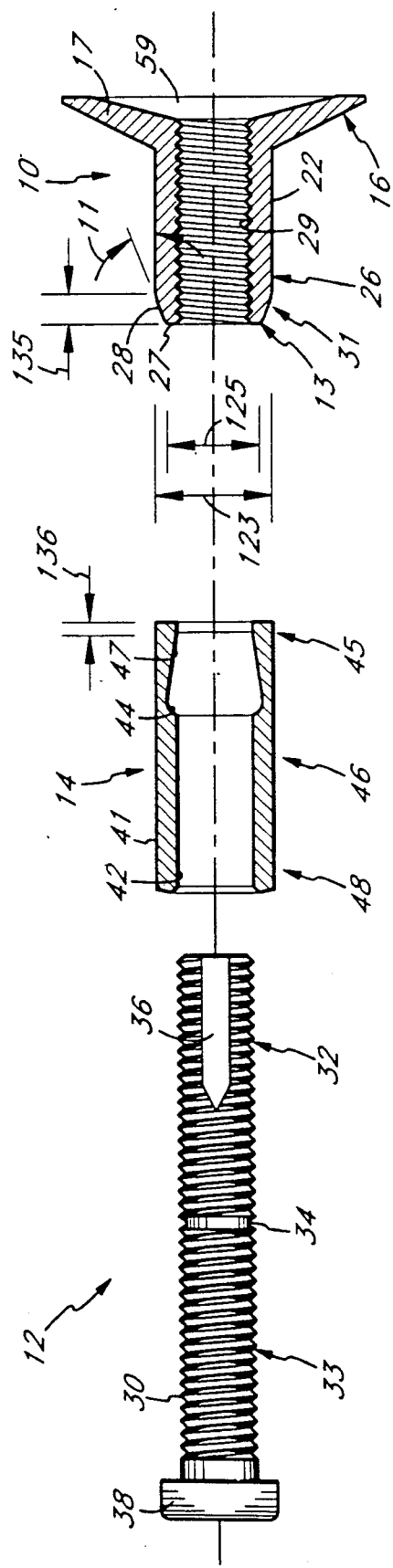
FIG. 1 is an exploded view of one embodiment of the blind fastener assembly of the present invention with the sleeve and fastener body in cross-section.
Figure 2:
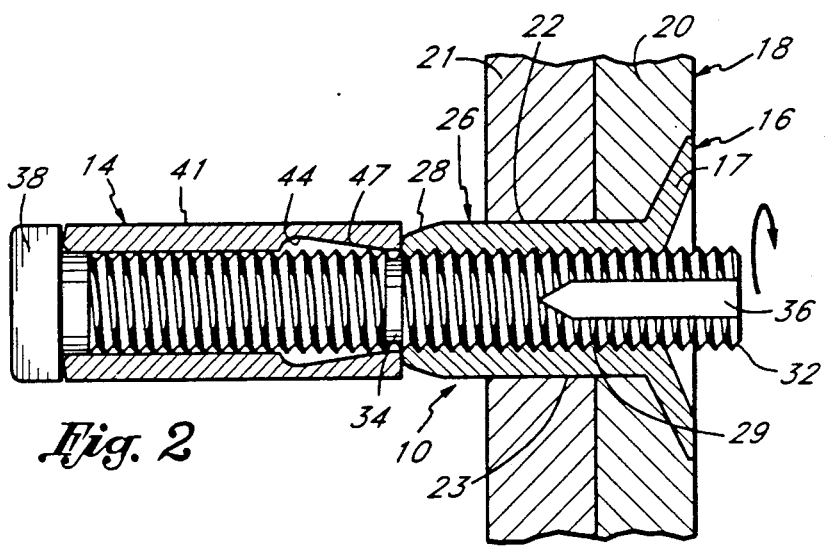
FIG. 2 shows the assembly of FIG. 1 inserted into a workpiece in a starting position.

Referring to FIGS. 1 and 2, the fastener of the invention comprises a tubular fastener body 10, a pin in the form of a core bolt 12 and a buckle sleeve 14. The tubular fastener body has a manufactured head 16 for bearing on a setting side 18 of a workpiece 20, a shank 22 of a diameter to fit into aligned holes 23 in workpiece 20 and 21 and a threaded axial bore 29. The blind end of the body 10 has a nose 26 with a contact section 27 and an adjacent slide section 28.

Core bolt 12 has male threads 30 for complementary receipt in the bore 29. The core bolt 12 has a tail section 32 joined to the permanent section 33 of the bolt at break groove 34. The tail has wrenching means in the form of opposed parallel flats 36. The tail extends axially beyond the head of the tubular fastener body for driving by a wrenching tool. Core bolt 12 has a head 38 at its blind end opposite tail 32. This head bears axially during compression on sleeve 14.

The tubular buckle sleeve 14 has a generally cylindrical constant diameter outer surface 41 and an axial bore 42 with a diameter of a size to accept the major thread diameter of core bolt 12. Sleeve 14 interposes between head 38 of core bolt 12 and nose section 26 of the tubular fastener body 10.

The buckle sleeve 14 includes a leading edge 45, a tapered section 46 and a trailing section 48, with the trailing section of the buckle sleeve adjacent the head 38 of the pin and the leading edge abutting the nose portion 26 of the fastener body 10. The leading edge 45 of the buckle sleeve 14 abuts the section 27 of the nose 26 of the body 10.

At the junction of the trailing section 48 and the tapered section 46 of the inner bore 42 of the buckle sleeve 14, an internal radially extending shoulder 44 is formed. The shoulder 44 has a larger outer diameter than the trailing section 48. The interior wall 47 of the leading edge 45 tapers axially to the shoulder 44, with the tapered surface diverging away from the central axis of the fastener. This creates a thick wall leading edge tapering through a thinner walled tapered section to the shoulder 44.

The inner and outer diameter of both the leading edge 45 of the buckle sleeve 14 and trailing section 48 are preferably substantially the same, but the inner diameter is less than the inner diameter of the sleeve along the shoulder of the tapered section 46.

Trailing section 48 axially backs-up the tapered section 46 and bears against head 38 of core bolt 12. The tapered section 46 has a cross-sectional area for resisting axial column loading that is considerably smaller than the cross-sectional area of the trailing section 48 that resists such loading. The tapered section fails at the shoulder 44 upon sufficient axial loading.

Shank 22 of the fastener body 10 extends axially from head 16 through the hole 23 in the workpieces to be fastened by the fastener. Nose 26 is axially spaced from head 16 relative to the thickness of the workpieces. This condition assures that the buckle of the sleeve will form prior to its contact against the backside workpiece. It also provides a band of material of the sleeve in tight, radial compression with the material of the workpieces so as to prevent rotation of the sleeve with respect to the workpieces.

In greater detail, flush mounted head 16 of fastener body 10 includes internal, 90° spaced slots 59 to provide the wrenching means for holding the fastener body stationary. In the alternative embodiment (not shown), a protruding head and a flush head nut may be used with external wrenching means. In either case, a flange or shoulder 17 provides bearing against the setting side 18 of workpiece 20. The area for such bearing is large enough so that the unit loading will not exceed the compression strength of the workpiece material.

To install the blind fastener assembly of the present invention in a pair of composite workpieces, a hole 23 is initially drilled through the workpieces 20, 21 large enough to receive the bolt head 38 the sleeve 14 and the shank 22 of the fastener body 10. The workpiece 20 is countersunk in an area around the hole so that when the assembly is inserted the fastener body is retained by its enlarged head 16 engaging the countersunk area in the workpiece.

An axial force is exerted on the head 38 of the core bolt 12 by rotating the bolt with a wrench. Head 38 and nose 26 compressively bear on sleeve 14 as bolt 12 is tightened in the fastener body 10. As the bolt advances axially, the head of the bolt applies axial force to the trailing section 48 of the sleeve 14, producing axial movement of the sleeve. This causes the sleeve leading edge 45 to press against the nose contact section 27.

Figure 3:
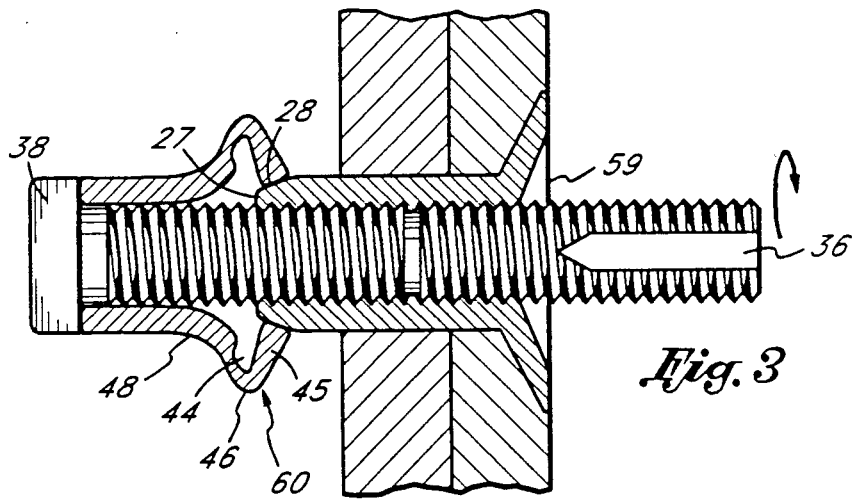
FIG. 3 shows the assembly of FIG. 1 in an intermediate installation position.
Figure 4:
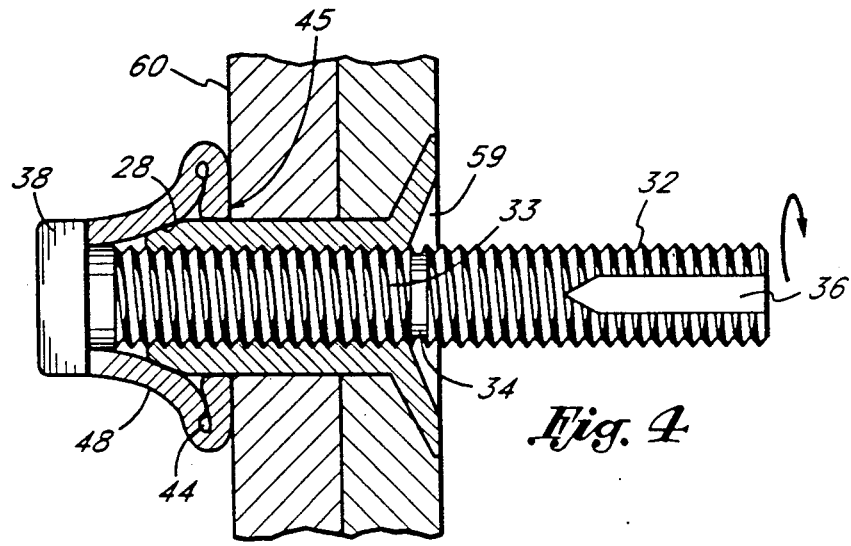
FIG. 4 shows the assembly of FIG. 1, substantially fully installed, but before the outer item portion is broken away.

Referring to FIG. 3, a partial buckle 60 initially forms in the vicinity of the shoulder 44, while the forward end of the sleeve is still abutting the contact section 27. Buckle formation is aided slightly by a tendency of the forward end to compress into the contact section 27 as buckle formation first begins. The trailing section 48 maintains its original shape during initial loading because of its thickness. Thus, the slide of the sleeve is retarded while buckling continues during its abutment with the contact section until the shoulder 44 with the buckle sleeve is deformed to a considerable extent.

Continued axial advancement of the bolt 12 results in the leading edge 45 of the sleeve 14 sliding on the contact section 27, over the nose radius and onto slide section 28, as shown in FIG. 3. The sliding of the leading edge of the sleeve 14 along the slide section provides additional resistance along the buckle sleeve 14 so that as the bolt 12 is advanced, buckle 60 formation continues so as to form a generally flat leading surface.

The essentially completely formed buckle 60 slides along the slide section 28 onto the shank 22 of the fastener body 10 until the broad face or surface of the buckle 60 makes contact with the workpiece 20. As the core bolt becomes tighter in the fastener body 10 during the setting of the fastener, the stress in breakneck groove 34 will increase to the ultimate strength of the core bolt at that point. The tail 32 will separate from the balance of the core bolt with the resulting failure and can be discarded. The separation occurs at a clamp-up force less than that which is calculated to provide damage to the workpiece 20.

A very stable, final configuration results which produces a symmetrical and very strong blind buckle with consistent pressure on the composite material of the workpieces 20, 21. This is achieved by consistent pressure during the formation of the buckle by creating the slide of the buckle sleeve 14 against the rivet body in relation to the buckle formation, with differential rates of slide of the end of the leading edge 45 of the buckle sleeve providing the proper buckle formation.

The generally flat surface contacting the workpiece, distributes the force transmitted by further translation of the mandrel throughout a maximized area of the blind side of the workpiece, thus substantially eliminating the problems of point pressure encountered in prior art fastener assemblies. Distribution of the force of contact over a broad area of the workpiece surface produces a low pressure in pounds per square inch on the workpiece 20.

The sleeve 14 buckles in a controlled manner. If the angle of the slide section 28 is too great, the buckle 60 may form too quickly. This results in buckles that extend forwardly towards the workpieces, not flush, thereby causing excessive unit loading on the workpieces. With insufficient angle, incomplete buckle formation occurs away from the workpieces. This also increases unit load on the workpieces when contacted by the buckle by causing the buckle to finish forming while contacting the workpieces. The configuration and interaction of the fastener body and buckle sleeve substantially eliminates non-uniformity or skewing of the buckle being formed. That is, the buckle radius at any particular time during buckle 60 formation is uniform around the entire periphery of the buckle sleeve 14, and is also uniformly spaced from the leading edge 45 of the buckle sleeve 14.

Figure 5:
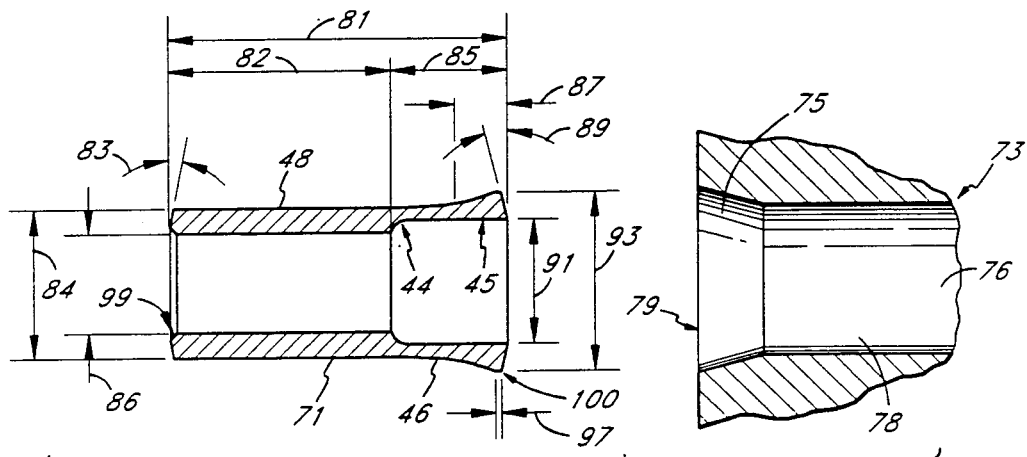
FIG. 5 is a cross-sectional view of the components comprising the buckle sleeve forming method of the present invention.
Figure 6:
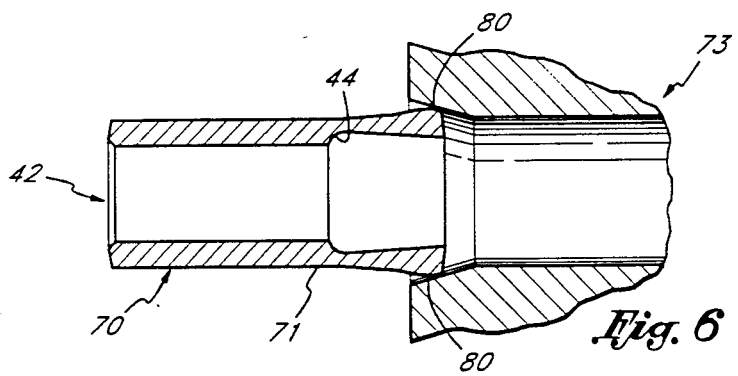
FIG. 6 is an intermediate step in the method of formation depicted in FIG. 5.
Figure 7:
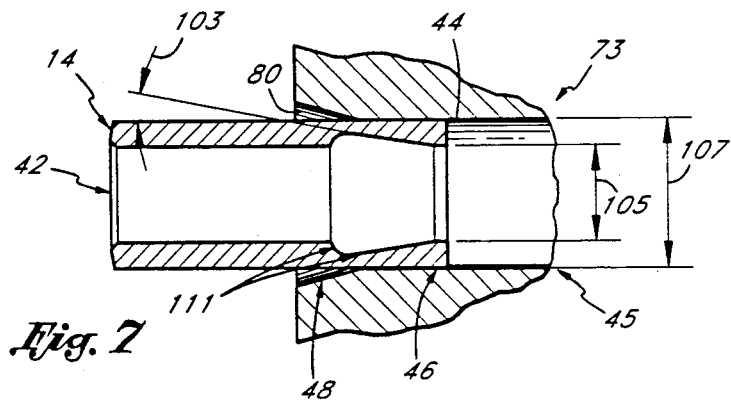
FIG. 7 is the final step of the method of formation depicted in FIG. 5.

Referring to FIGS. 5-7, representative dimensions of the buckle sleeve are as follows:

| | |
|---|---|
| Length 81: | .450 (in.) |
| O.D. 84 of trailing section 48: | .1955 |
| Length 84 of trailing section 48: | .308 |
| I.D. 86 of trailing section 48: | .1500 |
| O.D. 107 of leading edge 45: | .197 |
| I.D. 105 of leading edge 45: | .142 |
| Radius 111 of tapered section at shoulder 44: | .013/.017 |
| Length 136 of leading edge 45: | .0096 |
| Angle 103 of taper along tapered section 46: | 8° 30' |

Referring to FIG. 1, representative dimensions of the fastener body are as follows:

| | |
|---|---|
| Nose radius: | .005/.010 (in.) |
| I.D. of contact section 27: | .140 |
| O.D. 125 of contact section 27: | .166 |
| Angle 11 of slide section 28: | 10° |
| O.D. 123 of shank 22: | .197 |

FIGS. 5, 6 and 7 illustrate a method of manufacturing the buckle sleeve. In FIG. 5 the buckle sleeve 14 is initially formed with a semi-finished shape, the sleeve having a trailing section 48, a tapered section 46 and a leading edge 45. The semi-finished sleeve may be made by any of a number of commercially available methods; for instance, machining or by forming or heading. If made by heading, the forming die could be incorporated into the last station of a multiple die header for convenience purposes.

As can be seen, the semi-finished sleeve basically differs from the finished sleeve concerning its forward portion. That is, the trailing section 48 has constant inner and outer diameters. However, after the shoulder, the section 46 has a constant inner diameter. The outer diameter of the semi-finished sleeve gradually increases, starting in the vicinity of the shoulder 44, to the leading edge 45. The forward portion of that outwardly flared surface in an initial design of the product is a curve, about a radius of about 0.250 inch.

The forming die 73 depicted in FIG. 5 has an interior bore 76 comprising a flared female receiving portion 75 and a cylindrical portion 78. The receiving portion preferably has an inner diameter at its opening 79 approximately equal to or slightly larger than the outer diameter of the semi-finished buckle sleeve 70 at its leading edge 45. The receiving portion 75 is adapted to initially receive the leading portion 45 of the semi-finished sleeve 70. The receiving portion has its inner diameter gradually decreasing to the cylindrical portion 78 of the die, the cylindrical portion 78 having an inner diameter approximately equal to or greater than that of the outer diameter of the finished sleeve 14. The interaction between the leading edge of the semi-finished sleeve 70 and the opening 79 of the receiving portion 75 of the forming die prior to deformation of the semi-finished sleeve is depicted in FIG. 6.

As axial force is applied to the semi-finished sleeve 70 to place it into the forming die 73, the leading edge 45 of the semi-finished sleeve is gradually cammed inwardly by its interaction with the camming surfaces 80 of the receiving portion 75 of the die. By deforming the sleeve in this fashion, the outer diameter of the sleeve becomes constant along its length as it is fully contained within the cylindrical portion of the die, thus producing an inner diameter configuration as described above. FIG. 7 depicts the final forming of the semi-finished sleeve 70 into a finished sleeve 14.

Forming the finished sleeve in this method permits ready inspection of its inner and outer dimensions, specifically those dimensions relating to the shoulder 44 and taper 42 of the forward portion of the finished sleeve. The method also provides a less costly alternative in forming the finished sleeve 14 compared to producing it by machining an undercut into the tubular shell of the sleeve, thereby requiring complex machining and forming.

Having thus described the present invention, it should therefore be understood that other changes and modifications can be made without departing from the true scope and spirit of this invention as recited in the appended claims.

I claim:

1. A method of forming a buckle sleeve to be used in a blind fastener assembly, comprising the steps of:

forming a semi-finished buckle sleeve into a tubular shape having a leading section with a constant inner diameter and a trailing section with a constant but smaller inner diameter with an internal shoulder being formed at the intersection of said sections, said semi-finished sleeve having a constant outer diameter through said trailing section which flares outwardly in said leading section to a thickened leading edge; and deforming the leading section of said semi-finished buckle sleeve to produce a constant outer diameter throughout the length of the sleeve by moving said thickened leading edge radially inwardly and creating a taper which extends from a smaller inner diameter at the leading edge to a larger inner diameter at said shoulder, said deforming step including inserting the leading edge of said semi-finished sleeve into a die having an outwardly flared entry leading to a cylindrical main section, and forcing said semi-finished sleeve axially into said die so that the leading edge of said semi-finished sleeve is deformed radially inwardly by the cylindrical section of said die.

* * * * *